US012177650B2

(12) United States Patent
Suyama

(10) Patent No.: US 12,177,650 B2
(45) Date of Patent: Dec. 24, 2024

(54) AUDIO SIGNAL OUTPUT METHOD, AUDIO SIGNAL OUTPUT DEVICE, AND AUDIO SYSTEM

(71) Applicant: YAMAHA CORPORATION, Hamamatsu (JP)

(72) Inventor: Akihiko Suyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 203 days.

(21) Appl. No.: 18/057,974

(22) Filed: Nov. 22, 2022

(65) Prior Publication Data

US 2023/0199425 A1 Jun. 22, 2023

(30) Foreign Application Priority Data

Dec. 22, 2021 (JP) ................................ 2021-208284

(51) Int. Cl.

| | |
|---|---|
| ***H04S 7/00*** | (2006.01) |
| ***H04R 5/02*** | (2006.01) |
| ***H04R 5/033*** | (2006.01) |
| ***H04S 3/00*** | (2006.01) |

(52) U.S. Cl.

CPC ............... *H04S 7/304* (2013.01); *H04R 5/02* (2013.01); *H04R 5/033* (2013.01); *H04S 3/008* (2013.01); *H04S 2400/01* (2013.01); *H04S 2400/11* (2013.01); *H04S 2400/13* (2013.01); *H04S 2420/01* (2013.01)

(58) Field of Classification Search

CPC ...... H04S 7/304; H04S 3/008; H04S 2400/01; H04S 2400/11; H04S 2400/13; H04S 2420/01; H04R 5/02; H04R 5/033

USPC .......................................................... 381/303

See application file for complete search history.

(56) References Cited

U.S. PATENT DOCUMENTS

| | | | | |
|---|---|---|---|---|
| 10,708,706 B1 * | 7/2020 | Brimijoin, II | .......... | G06F 3/167 |
| 2009/0292544 A1 * | 11/2009 | Virette | .................... | H04S 3/004 704/501 |
| 2019/0116451 A1 * | 4/2019 | Noh | ........................ | H04S 7/307 |
| 2022/0030374 A1 | 1/2022 | Suyama et al. | | |

FOREIGN PATENT DOCUMENTS

WO 2020195568 A1 10/2020

* cited by examiner

*Primary Examiner* — Sean H Nguyen

(74) *Attorney, Agent, or Firm* — ROSSI, KIMMS & McDOWELL LLP

(57) ABSTRACT

An audio signal output method is provided. The audio signal output method includes acquiring audio data including an audio signal and sound source location information indicating a location of a sound source, acquiring the audio data and the sound source location information from the acquired audio data, performing sound image localization processing of a head-related transfer function on the acquired audio signal based on the acquired sound source location information, outputting the processed audio signal to an earphone, and outputting the acquired audio signal that has not been performed with sound image localization processing to a speaker, in a state where the location of the sound source indicated by the sound source location information is in a predetermined location.

19 Claims, 16 Drawing Sheets

AUDIO SIGNAL OUTPUT METHOD, AUDIO SIGNAL OUTPUT DEVICE, AND AUDIO SYSTEM

CROSS-REFERENCE TO RELATED APPLICATIONS

This application is based on and claims priority under 35 USC 119 from Japanese Patent Application No. 2021-208284 filed on Dec. 22, 2021, the contents of which are incorporated herein by reference.

TECHNICAL FIELD

One embodiment of the present invention relates to an audio signal output method, an audio signal output device, and an audio system that output an audio signal.

BACKGROUND ART

In the related art, there is an audio signal processing device that performs sound image localization processing for localizing a sound image of a sound source at a predetermined location using a plurality of speakers (see, for example, Patent Literature 1). Such an audio signal processing device performs the sound image localization processing by imparting a predetermined gain and a predetermined delay time to an audio signal and distributing the audio signal to a plurality of speakers. The sound image localization processing is also used for earphones. In earphones, sound image localization processing using a head-related transfer function is performed.

CITATION LIST

Patent Literature

Patent Literature 1: WO2020/195568

SUMMARY OF INVENTION

When using earphones, improvement of sound image localization is desired.

An object of the embodiment of the present invention is to provide an audio signal output method for improving sound image localization when using earphones.

An audio signal output method according to the present invention includes acquiring audio data including an audio signal and sound source location information indicating a location of a sound source; acquiring the audio data and the sound source location information from the acquired audio data; performing sound image localization processing of a head-related transfer function on the acquired audio signal based on the acquired sound source location information; outputting the processed audio signal to an earphone; and outputting the acquired audio signal that has not been performed with sound image localization processing to a speaker, in a state where the location of the sound source indicated by the sound source location information is in a predetermined location.

According to one embodiment of the present invention, sound image localization can be improved when using earphones.

DESCRIPTION OF EMBODIMENTS

First Embodiment

Figure 1:
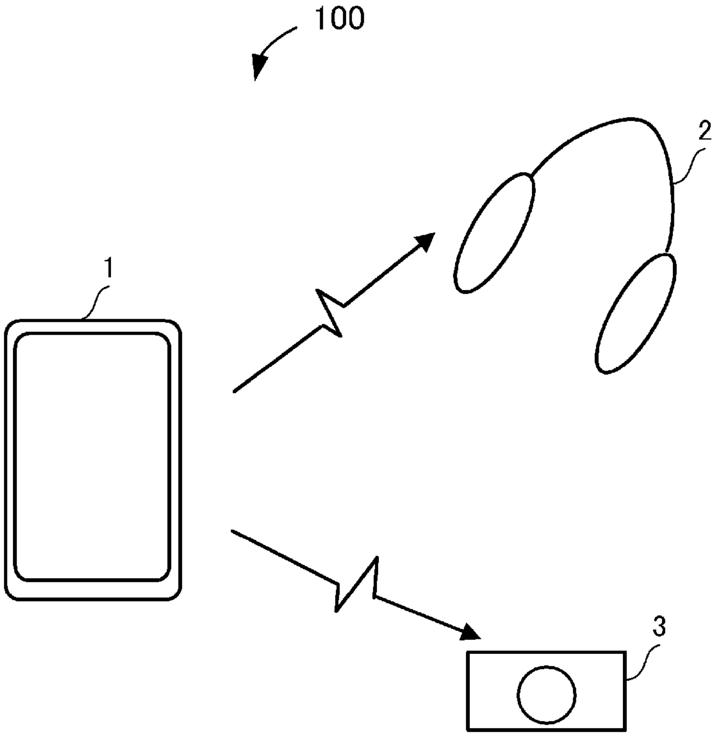
FIG. 1 is a block diagram showing an example of a main configuration of an audio system.
Figure 2:
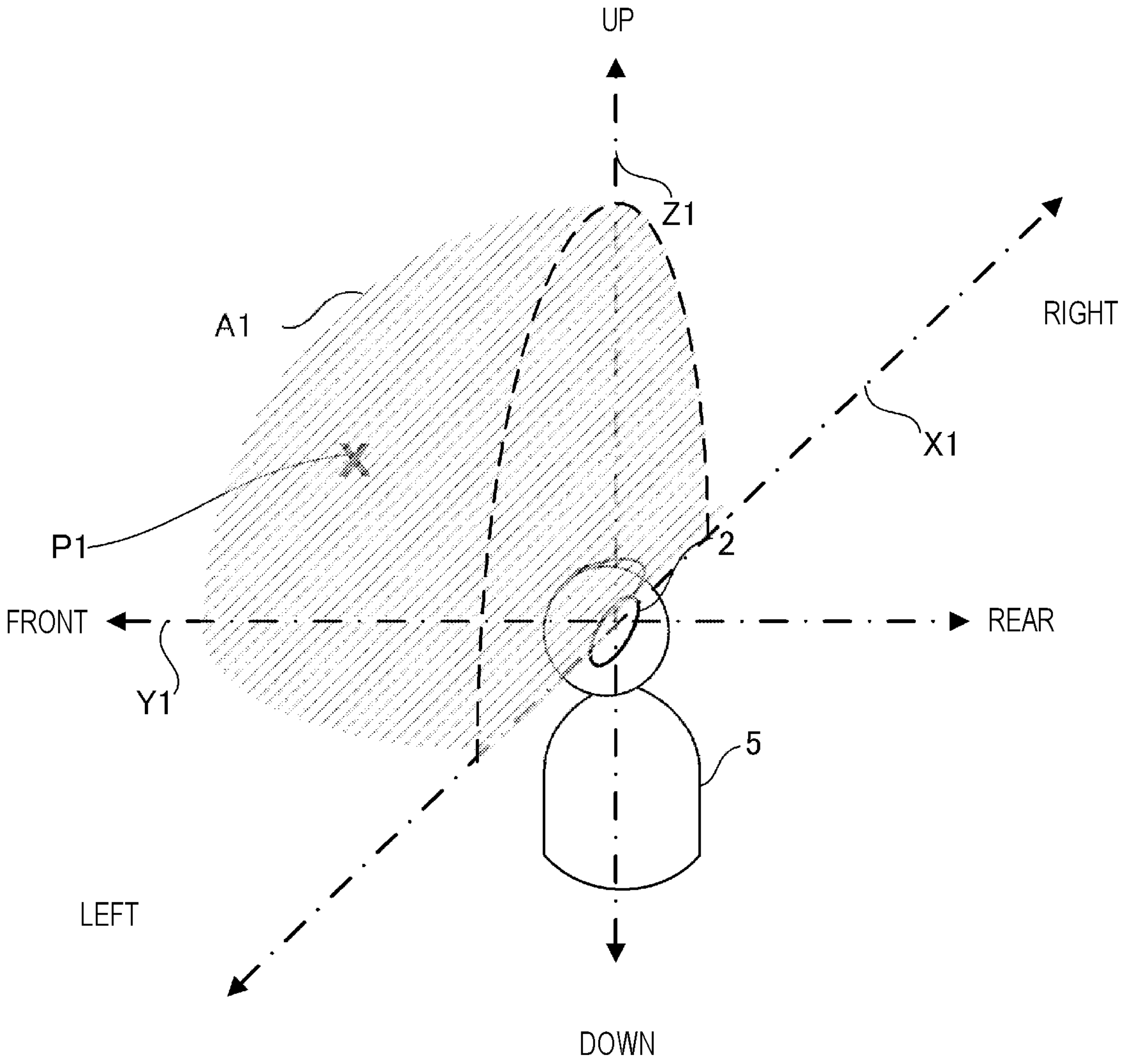
FIG. 2 is a schematic diagram showing a region where sound image localization is deteriorated when a headphone is used.
Figure 3:
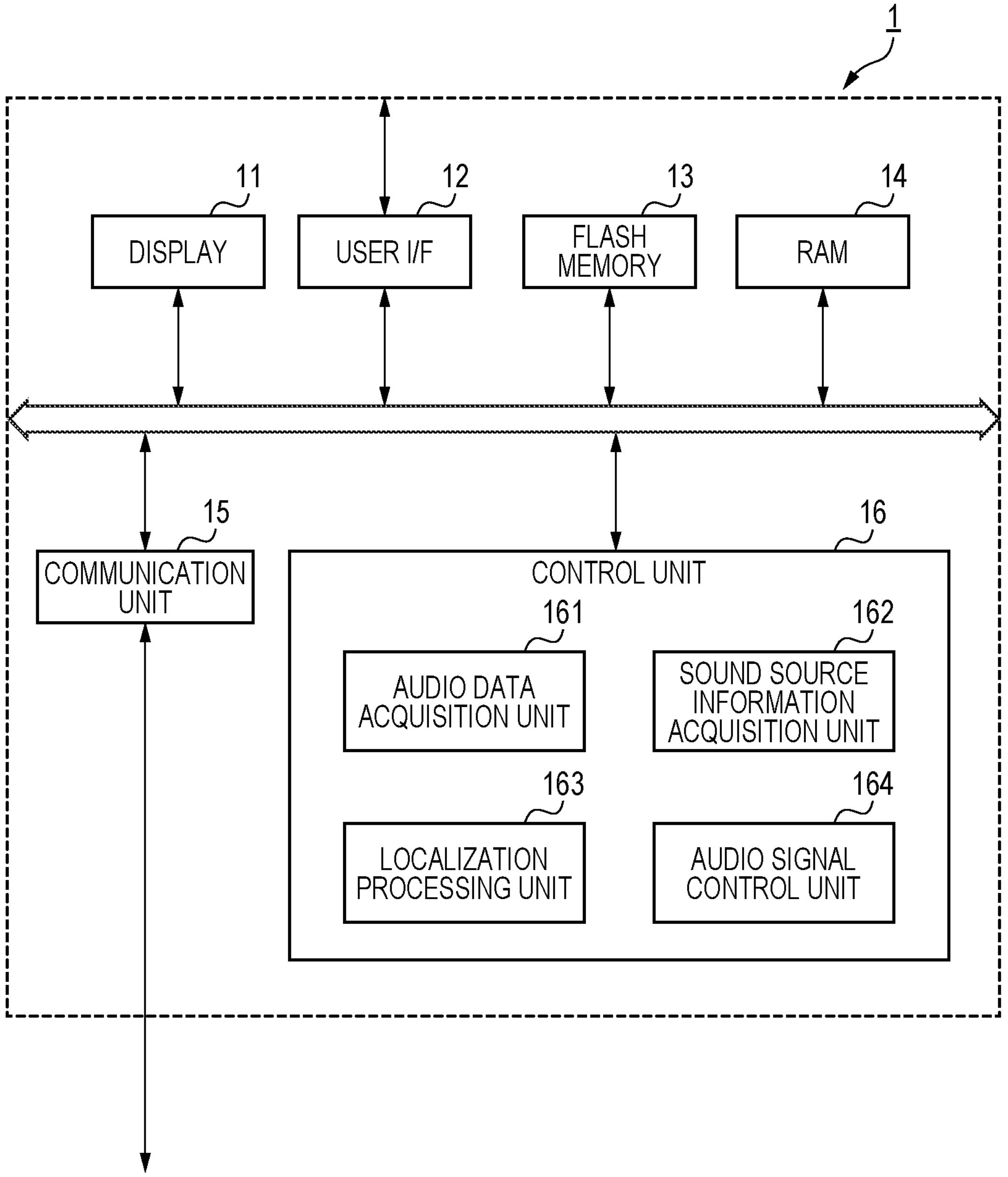
FIG. 3 is a block configuration diagram showing an example of a main configuration of a mobile terminal.
Figure 4:
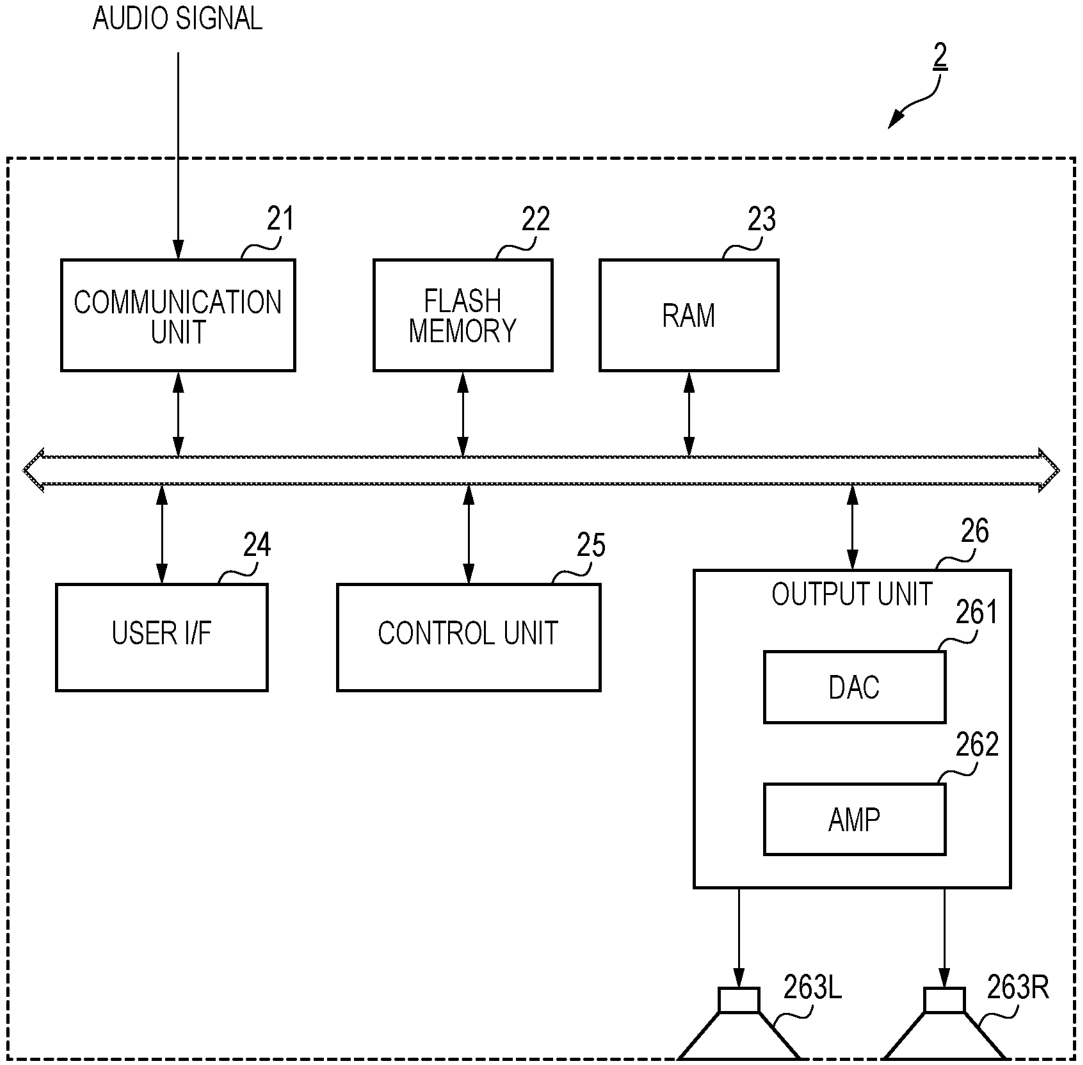
FIG. 4 is a block configuration diagram showing an example of a main configuration of the headphone.
Figure 5:
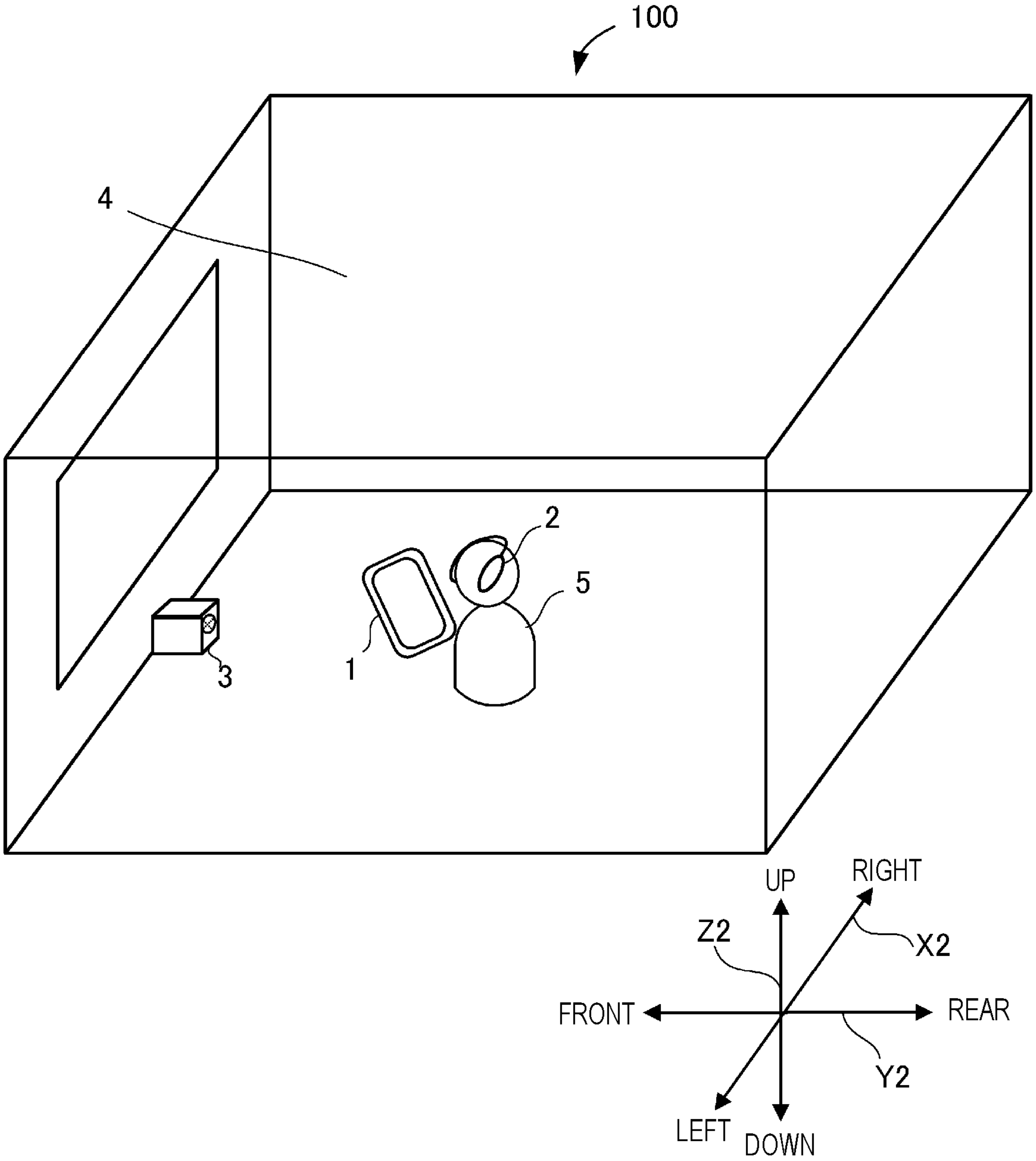
FIG. 5 is a schematic diagram showing an example of a space in which the audio system is used.
Figure 6:
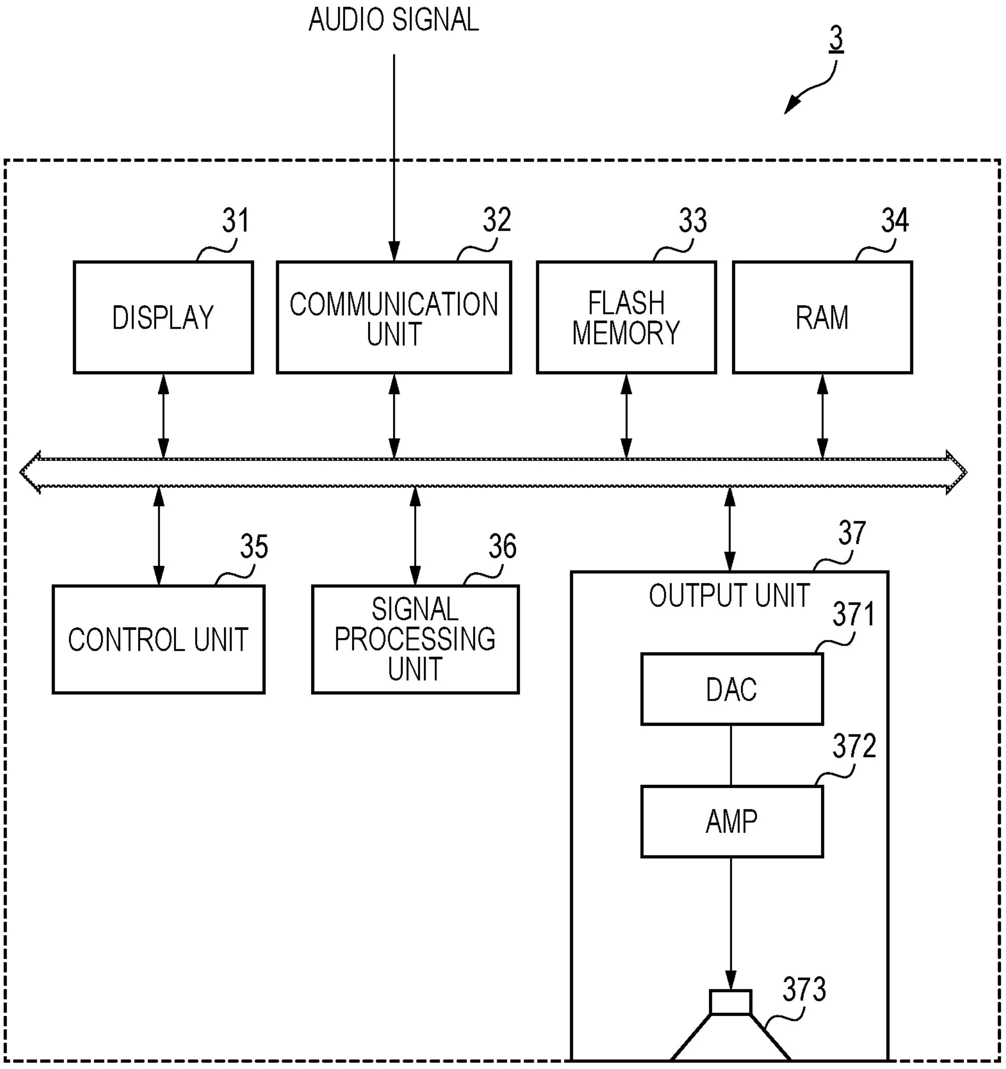
FIG. 6 is a block configuration diagram showing an example of a main configuration of a speaker.
Figure 7:
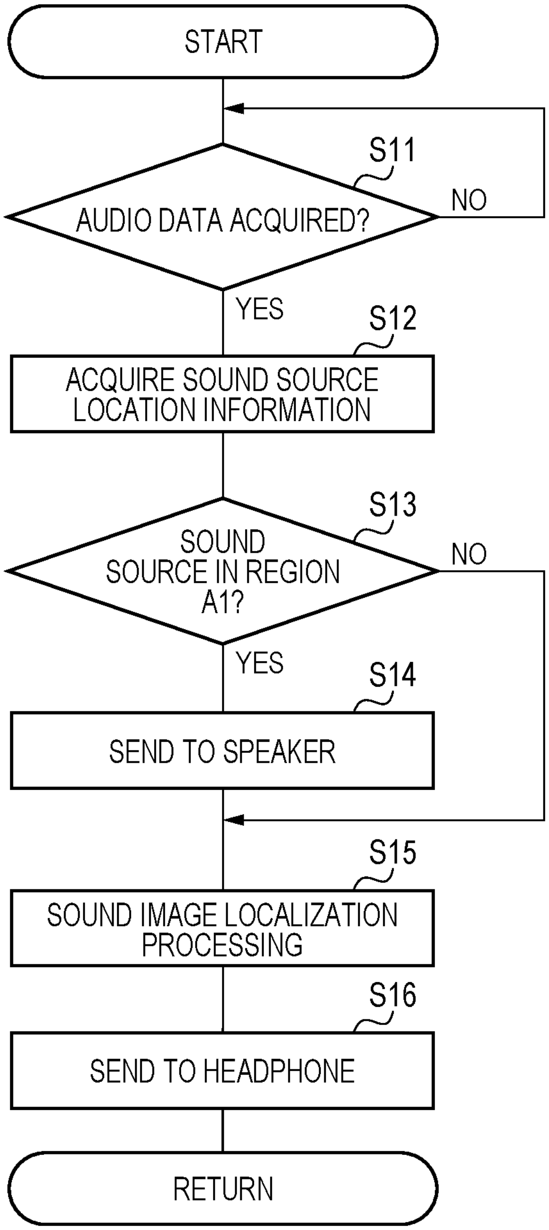
FIG. 7 is a flowchart showing operation of the mobile terminal in the audio system.

Hereinafter, an audio system 100 according to the first embodiment will be described with reference to the drawings. FIG. 1 is a block diagram showing an example of a configuration of the audio system 100. FIG. 2 is a schematic diagram showing a region A1 where sound image localization is deteriorated when a headphone 2 is used. In FIG. 2, a direction indicated by an alternate long and short dash line in a left-right direction of a paper surface is defined as a front-rear direction Y1. In FIG. 2, a direction indicated by an alternate long and short dash line in an up-down direction of the paper surface is defined as a vertical direction Z1. In FIG. 2, a direction indicated by an alternate long and short dash line orthogonal to the front-rear direction Y1 and the vertical direction Z1 is defined as a left-right direction X1. FIG. 3 is a block configuration diagram showing an example of a configuration of a mobile terminal 1. FIG. 4 is a block configuration diagram showing an example of a main configuration of the headphone 2. FIG. 5 is a schematic diagram showing an example of a space 4 in which the audio system 100 is used. In FIG. 5, a direction indicated by a solid line in the left-right direction of the paper surface is defined as a front-rear direction Y2. In FIG. 5, a direction indicated by a solid line in the up-down direction of the paper surface is defined as a vertical direction Z2. In FIG. 5, a direction indicated by a solid line orthogonal to the front-rear direction Y2 and the vertical direction Z2 is defined as a left-right direction X2. FIG. 6 is a block configuration diagram showing a main configuration of a speaker 3. FIG. 7 is a flowchart showing operation of the mobile terminal 1 in the audio system 100.

As shown in FIG. 1, the audio system 100 includes the mobile terminal 1, the headphone 2, and the speaker 3. The mobile terminal 1 referred to in this embodiment is an example of an audio signal output device of the present invention. The headphone 2 referred to in this embodiment is an example of an earphone of the present invention. It should be noted that the earphone is not limited to an in-ear type used by being inserted into an ear canal, but also includes an overhead type (headphone) including a headband as shown in FIG. 1.

The audio system 100 plays back a content selected by a user 5. In the present embodiment, the content is, for example, an audio content. The content may include video data. In the present embodiment, the audio data includes an audio signal and sound source location information for each of a plurality of sound sources.

The audio system 100 outputs sound from the headphone 2 based on the audio data included in the content. In the audio system 100, the user 5 wears the headphone 2. The user 5 operates the mobile terminal 1 to instruct selection and playback of the content. For example, when a content playback operation for playing back the content is received from the user 5, the mobile terminal 1 plays back the audio signal included in the audio data. The mobile terminal 1 sends the played back audio signal to the headphone 2. In the present embodiment, the mobile terminal 1 sends the audio signal subjected to sound image localization processing to the headphone 2. The headphone 2 emits sound based on the received audio signal. The mobile terminal 1 sends the audio signal to the speaker 3 according to a location of the sound source. The speaker 3 emits sound based on the received audio signal.

The mobile terminal 1 performs the sound image localization processing on the audio signal included in the audio data. The sound image localization processing is a processing of localizing a sound image of the sound source as if, for example, the sound from the sound source is generated at a location indicated by the sound source location information. The mobile terminal 1 performs the sound image localization processing on the audio signal based on the sound source location information included in the audio data. In other words, the mobile terminal 1 localizes the sound image according to the sound source location information indicating the location of the sound source. The mobile terminal 1 performs the sound image localization processing using a head-related transfer function stored in advance in a storage unit (for example, a flash memory 13 shown in FIG. 3). The head-related transfer function is a transfer function from the location of the sound source to a head of the user 5 (specifically, a left ear and a right ear of the user 5).

The head-related transfer function will be described in more detail. The mobile terminal 1 stores a large number of head-related transfer functions corresponding to location information of a plurality of sound sources in advance. There are two head-related transfer functions, one from the sound source to the right ear and one to the left ear. The mobile terminal 1 reads out the head-related transfer function of the location information that matches the sound source location information of the sound source included in the audio data, and separately convolutes the head-related transfer function to the right ear and the head-related transfer function to the left ear into the audio signal. The mobile terminal 1 sends an audio signal in which the head-related transfer function to the right ear is convoluted to the headphone 2 as an audio signal corresponding to an R (right) channel. The mobile terminal 1 sends an audio signal in which the head-related transfer function to the left ear is convoluted to the headphone 2 as an audio signal corresponding to an L (left) channel.

When the mobile terminal 1 does not store the head-related transfer function corresponding to the same location as the sound source location information included in the audio data, the mobile terminal 1 may perform panning processing using a plurality of head-related transfer functions corresponding to location information close to the location indicated by the sound source location information. For example, when the sound source location information is in a direction of 45 degrees to the front right (when a front direction is 0 degree), the mobile terminal 1 reads out two head-related transfer functions of 60 degrees to the front right and 30 degrees to the front right. The mobile terminal 1 convolutes the two head-related transfer functions into the audio signal, respectively. As a result, the user 5 hears sound of the same sound source at the same volume from the two directions of 60 degrees to the front right and 30 degrees to the front right, so that the user 5 obtains a sense of localization of the sound image in the direction of 45 degrees to the front right. The mobile terminal 1 can localize the sound image at an appropriate location by convoluting the plurality of head-related transfer functions into the audio signal and then performing the panning processing for adjusting volume balance of each audio signal after the convolution, even if the head-related transfer function corresponding to the same location as the sound source location information is not stored. The above processing is an example of processing for the head-related transfer function.

In use of the headphone 2, it may be difficult to localize the sound image when the sound image is localized using the head-related transfer function. For example, in the use of the headphone 2, when the sound source is included in the region A1 that is in front of a top of the head of the user 5 (for example, a location P1) as shown in FIG. 2, it becomes difficult to localize the sound image. In particular, when the sound source is included in the region A1 that is in front of the top of the head of the user 5 as shown in FIG. 2, the user 5 may not be able to obtain a "sense of distance" from the sound source. The localization also affects vision. Since the sound image localization using the head-related transfer function is a virtual localization, the user 5 cannot actually see an object corresponding to the sound source in the region A1. Therefore, even when the location of the sound source exists in the region A1, the user 5 may not be able to perceive the sound image of the sound source existing in the region A1 and may perceive the sound source at the location of the headphone (head).

In such a case, the audio system 100 causes the speaker in front of the user 5 to emit sound. The speaker 3 actually emits the sound of the sound source from a distant location in front of the user 5. As a result, the user 5 can perceive the sound image of the sound source at the distant location in front of the user 5. Therefore, the audio system 100 of the present embodiment can improve the sense of localization by compensating for the "forward localization" and the "sense of distance" that are difficult to obtain by the head-related transfer function with the speaker 3.

Hereinafter, the configuration of the mobile terminal 1 will be described with reference to FIG. 3. As shown in FIG.

3, the mobile terminal 1 includes a display 11, a user interface (I/F) 12, a flash memory 13, a RAM 14, a communication unit 15, and a control unit 16.

The display 11 displays various kinds of information according to control by the control unit 16. The display 11 includes, for example, an LCD. The display 11 stacks touch panels, which is one aspect of the user I/F 12, and displays a graphical user interface (GUI) screen for receiving the operation by the user 5. The display 11 displays, for example, a speaker setting screen, a content playback screen, and a content selection screen.

The user I/F 12 receives operation on the touch panel by the user 5. The user I/F 12 receives, for example, content selection operation for selecting a content from the content selection screen displayed on the display 11. The user I/F 12 receives, for example, content playback operation from the content playback screen displayed on the display 11.

The communication unit 15 includes, for example, a wireless communication I/F conforming to a standard such as Wi-Fi (registered trademark) and Bluetooth (registered trademark). The communication unit 15 includes a wired communication I/F conforming to a standard such as USB. The communication unit 15 sends an audio signal corresponding to a stereo channel to the headphone 2 by, for example, wireless communication. The communication unit 15 sends an audio signal to the speaker 3 by wireless communication.

The flash memory 13 stores a program related to operation of the mobile terminal 1 in the audio system 100. The flash memory 13 also stores the head-related transfer function. The flash memory 13 further stores the content.

The control unit 16 reads the program stored in the flash memory 13, which is a storage medium, into the RAM 14 to implement various functions. The various functions include, for example, audio data acquisition processing, sound source information acquisition processing, localization processing, and audio signal control processing. More specifically, the control unit 16 reads programs related to the audio data acquisition processing, the sound source information acquisition processing, the localization processing, and the audio signal control processing into the RAM 14. As a result, the control unit 16 includes an audio data acquisition unit 161, a sound source information acquisition unit 162, a localization processing unit 163, and an audio signal control unit 164.

The control unit 16 may download the programs for executing the audio data acquisition processing, the sound source information acquisition processing, the localization processing, and the audio signal control processing from, for example, a server. Therefore, the control unit 16 may include the audio data acquisition unit 161, the sound source information acquisition unit 162, the localization processing unit 163, and the audio signal control unit 164.

For example, when the content selection operation by the user 5 is received from the user I/F 12, the audio data acquisition unit 161 acquires the audio data included in the content. The audio data includes the audio signal related to the sound source and the sound source location information indicating the location of the sound source.

The sound source information acquisition unit 162 acquires the sound source location information indicating the location of the sound source included in the audio data. In other words, the sound source information acquisition unit 162 extracts the sound source location information from the audio data. The sound source location information indicates the location of the sound source by, for example, polar coordinates centered on the user 5.

The localization processing unit 163 performs the sound image localization processing of the head-related transfer function based on the sound source location information on the audio signal related to the audio data acquired by the sound source information acquisition unit 162. The localization processing unit 163 reads a head-related transfer function that matches the location of the sound source indicated by the sound source location information from the plurality of head-related transfer functions, and convolutes the head-related transfer function into the audio signal. The localization processing unit 163 generates an audio signal corresponding to the L channel in which the head-related transfer function from the location of the sound source to the left ear is convoluted, and an audio signal corresponding to the R channel in which the head-related transfer function to the right ear is convoluted.

The audio signal control unit 164 outputs the stereo signal including the audio signal corresponding to the L channel and the audio signal corresponding to the R channel after the sound image localization processing by the localization processing unit 163, to the headphone 2 via the communication unit 15.

The audio signal control unit 164 determines whether the location of the sound source is a predetermined location. The audio signal control unit 164 outputs the audio signal to the speaker 3 if, for example, the location of the sound source exists in the region A1 (see FIG. 2) that is in front of the top of the head of the user 5. The audio signal control unit 164 does not send the audio signal to the speaker 3 if the location of the sound source does not exist in the region A1.

The audio signal control unit 164 may or may not output the audio signal to the headphone 2 when the location of the sound source exists in the region A1 (see FIG. 5). In the present embodiment, the audio signal control unit 164 outputs the audio signal to the headphone 2 even when the location of the sound source is in the region A1.

The headphone 2 will be described with reference to FIG. 4. The headphone 2 includes a communication unit 21, a flash memory 22, a RAM 23, a user interface (I/F) 24, a control unit 25, and an output unit 26.

The user I/F 24 receives operation from the user 5. The user I/F 24 receives, for example, content playback on/off switching operation or volume level adjustment operation.

The communication unit 21 receives an audio signal from the mobile terminal 1. The communication unit 21 sends a signal based on the user operation received by the user I/F 24 to the mobile terminal 1.

The control unit 25 reads an operation program stored in the flash memory 22 into the RAM 23 and executes various functions.

The output unit 26 is connected to a speaker unit 263L and a speaker unit 263R. The output unit 26 outputs the audio signal after the signal processing to the speaker unit 263L and the speaker unit 263R. The output unit 26 includes a DA converter (hereinafter referred to as DAC) 261 and an amplifier (hereinafter referred to as AMP) 262. The DAC 261 converts a digital signal after the signal processing into an analog signal. The AMP 262 amplifies the analog signal for driving the speaker unit 263L and the speaker unit 263R. The output unit 26 outputs the amplified analog signal (audio signal) to the speaker unit 263L and the speaker unit 263R.

The audio system 100 of the first embodiment is used, for example, in a space 4, as shown in FIG. 5. The space 4 is, for example, a living room. The user 5 faces a front side (a front side in the front-rear direction Y2) near a center of the space 4 and listens to the content via the headphone 2. The speaker 3 is arranged in the front side of the space 4 (front side in the front-rear direction Y2) and in a center of the left-right direction X2.

The speaker 3 will be described with reference to FIG. 6. As shown in FIG. 6, the speaker 3 includes a display 31, a communication unit 32, a flash memory 33, a RAM 34, a control unit 35, a signal processing unit 36, and an output unit 37.

The display 31 includes a plurality of LEDs or LCDs. The display 31 displays, for example, a state of connection to the mobile terminal 1. The display 31 may also display, for example, content information during playback. In this case, the speaker 3 receives the content information included in the content from the mobile terminal 1.

The communication unit 32 includes, for example, a wireless communication I/F conforming to a standard such as Wi-Fi (registered trademark) and Bluetooth (registered trademark). The communication unit 32 receives an audio signal from the mobile terminal 1 by wireless communication.

The control unit 35 reads a program stored in the flash memory 33, which is a storage medium, into the RAM 34 to implement various functions. The control unit 35 inputs the audio signal received via the communication unit 32 to the signal processing unit 36.

The signal processing unit 36 includes one or a plurality of DSPs. The signal processing unit 36 performs various kinds of signal processing on the input audio signal. The signal processing unit 36 applies, for example, signal processing such equalizer processing to the audio signal.

The output unit 37 includes a DA converter (DAC) 371, an amplifier (AMP) 372, and a speaker unit 373. The DA converter 371 converts the audio signal processed by the signal processing unit 36 into an analog signal. The amplifier 372 amplifies the analog signal. The speaker unit 373 emits the amplified analog signal. The speaker unit 373 may be a separate body.

The operation of the mobile terminal 1 in the audio system 100 will be described with reference to FIG. 7.

If the audio data is acquired (S11: Yes), the mobile terminal 1 acquires the sound source location information of the sound source included in the audio data (S12). From the sound source location information, the mobile terminal 1 determines whether the location of the sound source exists in the region A1 that is in front of the top of the head of the user 5 (S13). If the location of the sound source is determined to be in the region A1 (S13: Yes), the mobile terminal 1 sends the audio signal related to the sound source to the speaker 3 (S14). The mobile terminal 1 performs the sound image localization processing on the audio signal related to the sound source based on the sound source location information (S15). The mobile terminal 1 sends the audio signal after the sound image localization processing to the headphone 2 (S16). The audio data referred to here includes the audio signal and the location information of the sound source. The audio signal is a signal that is a basis of the sound emitted by the speaker 3.

The speaker 3 receives the audio signal sent from the mobile terminal 1. The speaker 3 emits the sound based on the received audio signal.

If the mobile terminal 1 determines that the location of the sound source is not in the region A1 (S13: No), the processing shifts to the sound image localization processing (S15).

The headphone 2 receives the audio signal sent from the mobile terminal 1. The headphone 2 emits the sound based on the received audio signal.

When the user 5 uses the headphone 2 and the location of the sound source is in a predetermined location (for example, the region A1) where it is difficult to feel the sense of localization, the mobile terminal 1 sends the audio signal of the same sound source to the speaker 3 in order to compensate for the sense of localization. As a result, even when it is difficult to localize the sound image with the headphone 2 alone, the speaker 3 can compensate for the sense of localization by emitting sound based on the audio signal. The mobile terminal 1 can improve the sound image localization when the headphone 2 is used.

When the location of the speaker 3 is stored in advance, the mobile terminal 1 sends an audio signal of a volume level based on the location of the sound source and the location of the speaker 3 to the speaker 3. More specifically, the mobile terminal 1 calculates a relative location between the speaker 3 and the sound source, and adjusts the volume level of the audio signal sent to the speaker 3 based on a calculation result.

Second Embodiment

Figure 8:
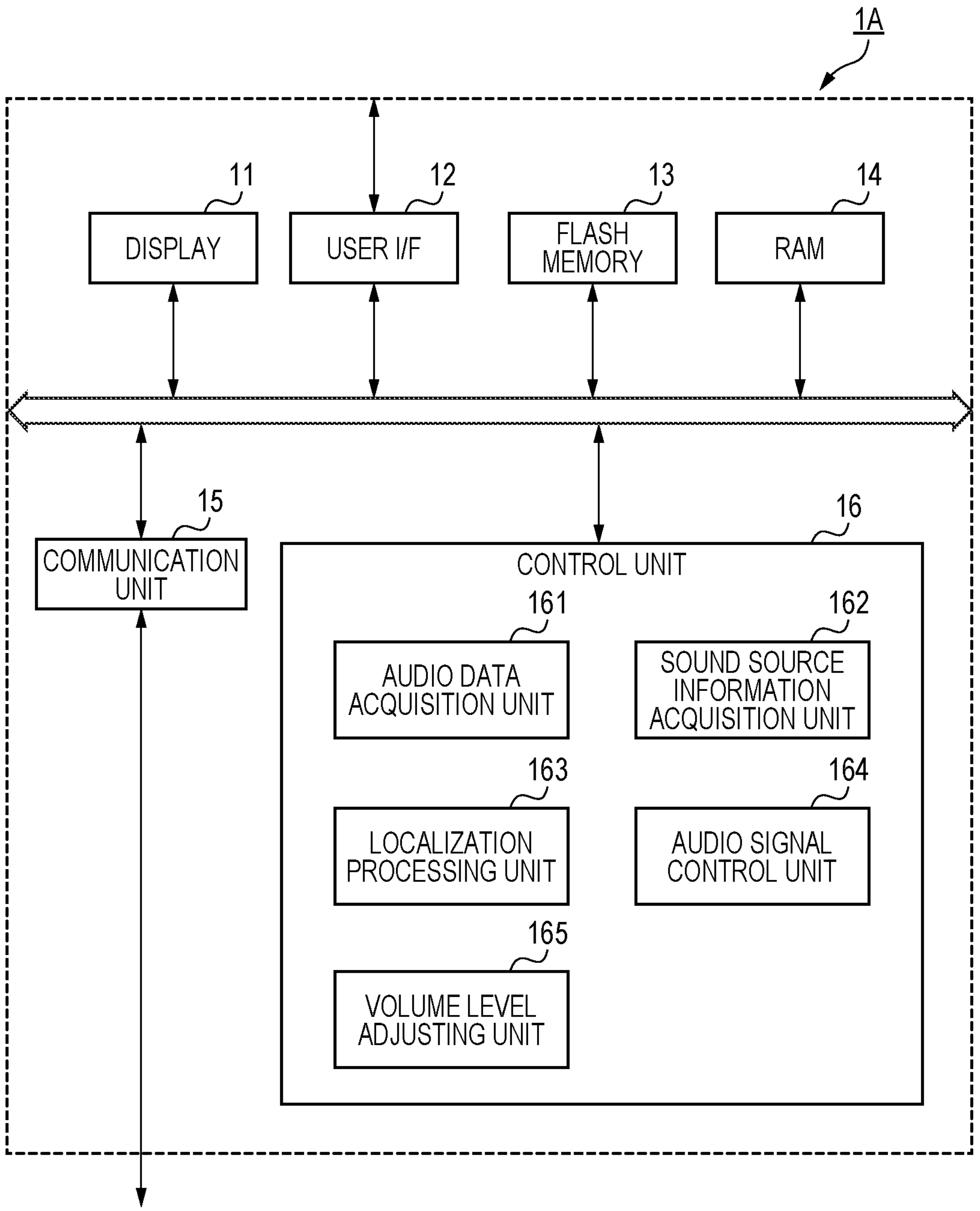
FIG. 8 is a block configuration diagram showing a main configuration of a mobile terminal according to a second embodiment.
Figure 9:
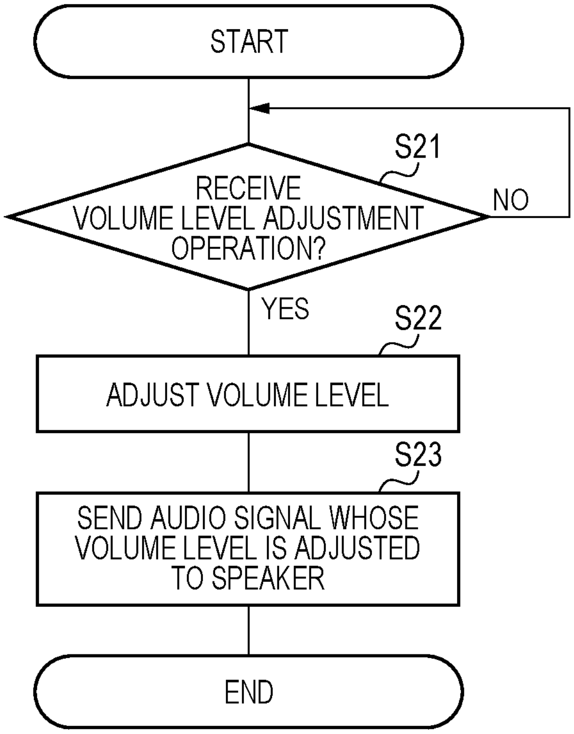
FIG. 9 is a flowchart showing operation of the mobile terminal according to the second embodiment.

The audio system 100 according to the second embodiment adjusts a volume level of the speaker 3 by a mobile terminal 1A. The second embodiment will be described with reference to FIGS. 8 and 9. FIG. 8 is a block configuration diagram showing an example of a main configuration of the mobile terminal 1A according to the second embodiment. FIG. 9 is a flowchart showing operation of the mobile terminal 1A according to the second embodiment. The same components as those in the first embodiment are designated by the same reference numerals, and detailed description thereof will be omitted.

The mobile terminal 1A controls the volume level of the sound emitted from the speaker 3 according to the location of the sound source. As shown in FIG. 8, the mobile terminal 1A further includes a volume level adjusting unit 165. The volume level adjusting unit 165 adjusts the volume level of the sound emitted from the speaker 3 according to the location of the sound source.

For example, when sound related to a sound source existing in the region A1 (see FIG. 5) (hereinafter referred to as the sound source S1) and sound related to a sound source not existing in the region A1 (hereinafter referred to as a sound source S2) are simultaneously emitted from the headphone 2, the sound related to the sound source S1 is emitted from the speaker 3. In this case, since the sound related to the sound source S1 is also emitted from the speaker 3, the volume level of the sound source S1 may be relatively higher than the volume level of the sound source S2.

Therefore, the mobile terminal 1A adjusts the volume level of the audio signal sent to the speaker 3 based on the operation from the user 5. In this case, the user 5 adjusts the volume level of the audio signal sent to the speaker 3 based on the operation received via the user I/F 12 of the mobile terminal 1A before or during the playback of the content. Then, the mobile terminal 1A sends an audio signal whose volume level is adjusted to the speaker 3. The speaker 3 receives the audio signal whose volume level is adjusted.

An example of the operation of the mobile terminal 1A will be described with reference to FIG. 9. If the mobile terminal 1A receives volume level adjustment operation via the user I/F 12 (S21: Yes), the volume level adjustment unit 165 adjusts the volume level of the audio signal to be sent to the speaker 3 based on the volume level adjustment operation (S22). The mobile terminal 1A sends the audio signal whose volume level is adjusted to the speaker 3 (S23).

In this way, the mobile terminal 1A according to the second embodiment adjusts the volume level of the speaker 3. That is, when the location of the sound source exists in the region A1, the mobile terminal 1A adjusts the volume level of the sound emitted from the speaker 3 based on the operation from the user 5. As a result, when the user 5 feels that the sound of the sound source in the region A1 is too loud than sound of a sound source in other regions, the user 5 can listen to the content without discomfort by lowering the volume level of the sound of the speaker 3. When the user 5 feels that the location of the sound source exists in the region A1 and the sense of localization is weak in use of the headphone 2, the sound image localization can be improved by raising the volume level of the sound of the speaker 3.

The volume level adjusting unit 165 may generate volume level information indicating the volume level, and may send the volume level information to the speaker 3 via the communication unit 15. More specifically, the volume level adjusting unit 165 sends the volume level information for adjusting the volume of the sound emitted from the speaker 3 to the speaker 3 according to the received volume level adjustment operation. The speaker 3 adjusts the volume level of the sound to be emitted based on the received volume level information.

Third Embodiment

Figure 10:
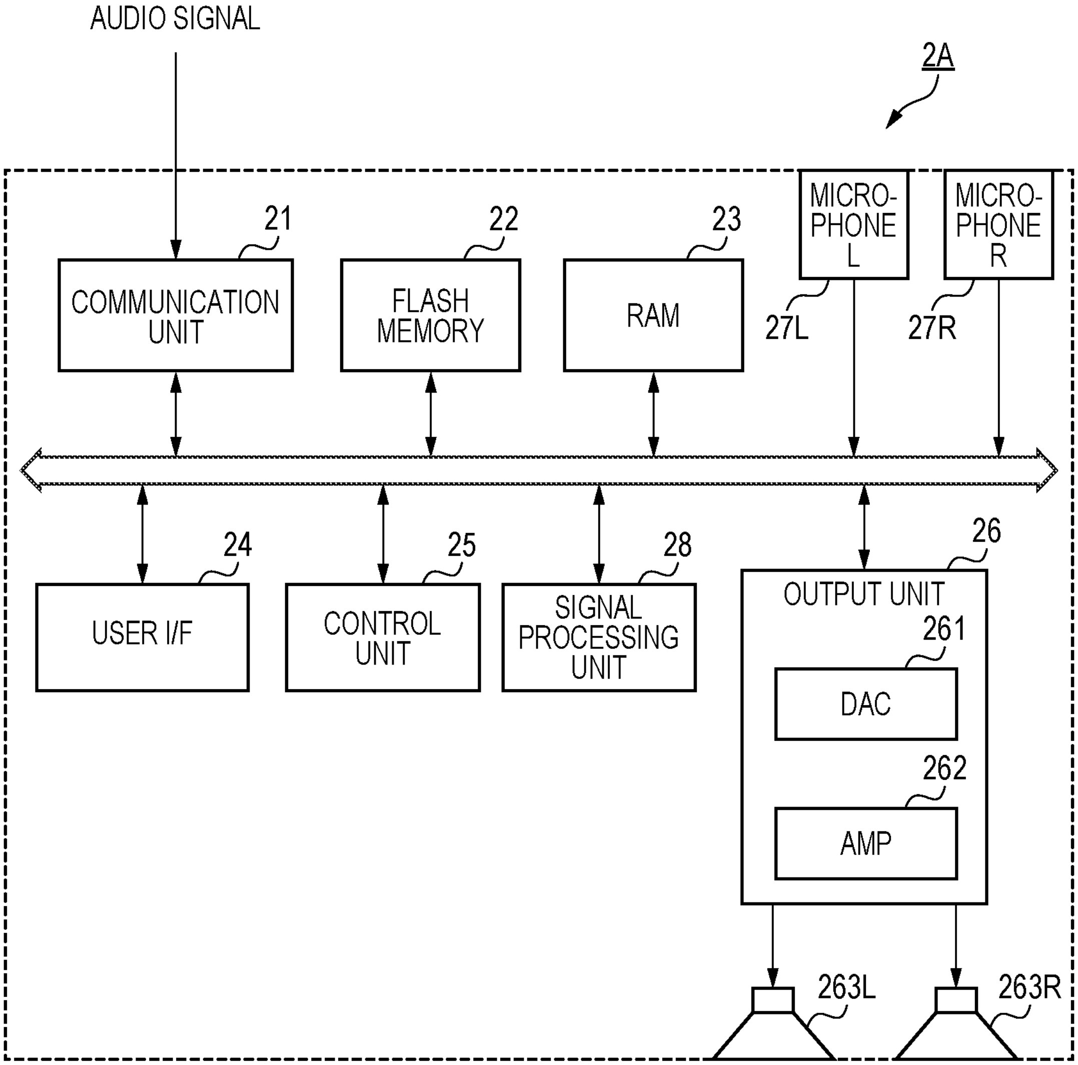
FIG. 10 is a block configuration diagram showing a main configuration of a headphone according to a third embodiment.

The audio system 100 according to the third embodiment acquires the external sound through a microphone installed in a headphone 2A. The headphone 2A outputs the acquired external sound from the speaker unit 263L and the speaker unit 263R. The third embodiment will be described with reference to FIG. 10. FIG. 10 is a block configuration diagram showing a main configuration of the headphone 2A in the third embodiment. The same components as those in the first embodiment are designated by the same reference numerals, and detailed description thereof will be omitted.

As shown in FIG. 10, the headphone 2A includes a microphone 27L and a microphone 27R.

The microphone 27L and the microphone 27R collect the external sound. The microphone 27L is provided in, for example, a head unit attached to the left ear of the user 5. The microphone 27R is provided in, for example, a head unit attached to the right ear of the user 5.

In the headphone 2A, for example, when sound is emitted from the speaker 3, the microphone 27L and the microphone 27R are turned on. That is, in the headphone 2A, for example, when the sound is emitted from the speaker 3, the microphone 27L and the microphone 27R collect the external sound.

The headphone 2A filters the sound signal collected by the microphone 27L and the microphone 27R by the signal processing unit 28. The headphone 2A does not emit the collected sound signal as it is from the speaker unit 263L and the speaker unit 263R, but filters the sound signal by a filter coefficient for correcting a difference in sound quality between the collected sound signal and the actual external sound. More specifically, the headphone 2A digitally converts the collected sound and performs signal processing. The headphone 2A converts the sound signal after the signal processing into an analog signal and emits sound from the speaker unit 263L and the speaker unit 263R.

In this way, the headphone 2A adjusts the sound signal after the signal processing so that the user 5 acquires the same sound quality as when he or she directly listens to the external sound. As a result, the user 5 can listen to the external sound as if he or she is directly listening to the external sound without going through the headphone 2A.

In the audio system 100 according to the third embodiment, when it is determined that the location of the sound source exists in the region A1, the mobile terminal 1 sends the audio signal included in the audio data to the speaker 3. The speaker 3 emits sound based on the audio signal. The headphone 2A collects the sound emitted by the speaker 3 by the microphone 27L and the microphone 27R. The headphone 2A performs the signal processing on the audio signal based on the collected sound, and emits the sound from the speaker units 263L and 263R. The user 5 can listen to the external sound as if he or she does not wear the headphone 2A. As a result, the user 5 can perceive the sound emitted from the speaker 3 and more strongly recognize the sense of distance from the sound source. Therefore, the audio system 100 can further improve the sound image localization.

The headphone 2A according to the third embodiment may stop the audio signal related to the sound source existing in the region A1 (adjust the volume level to 0 level) at a timing when the external sound is collected. In this case, the headphone 2A emits only the sound related to the sound source that does not exist in the region A1.

When the microphone 27L and the microphone 27R do not collect the sound from the speaker 3, the microphone 27L and the microphone 27R may be in an off state.

The microphone 27L and the microphone 27R may be set to an ON state so as to collect the external sound even when no sound is emitted from the speaker 3. In this case, the headphone 2A can reduce noise from outside by using a noise canceling function. The noise canceling function is to generate a sound having a phase opposite to the collected sound (noise) and emit the sound having the opposite phase together with the sound based on the audio signal. The headphone 2A turns off the noise canceling function when the noise canceling function is in an on state and the sound is emitted from the speaker 3. More specifically, the headphone 2A determines whether the sound collected by the microphone 27L and the microphone 27R is the sound emitted from the speaker 3. When the collected sound is the sound emitted from the speaker 3, the headphone 2A turns off the noise canceling function, performs signal processing on the collected sound, and emits the sound.

Fourth Embodiment

Figure 11:
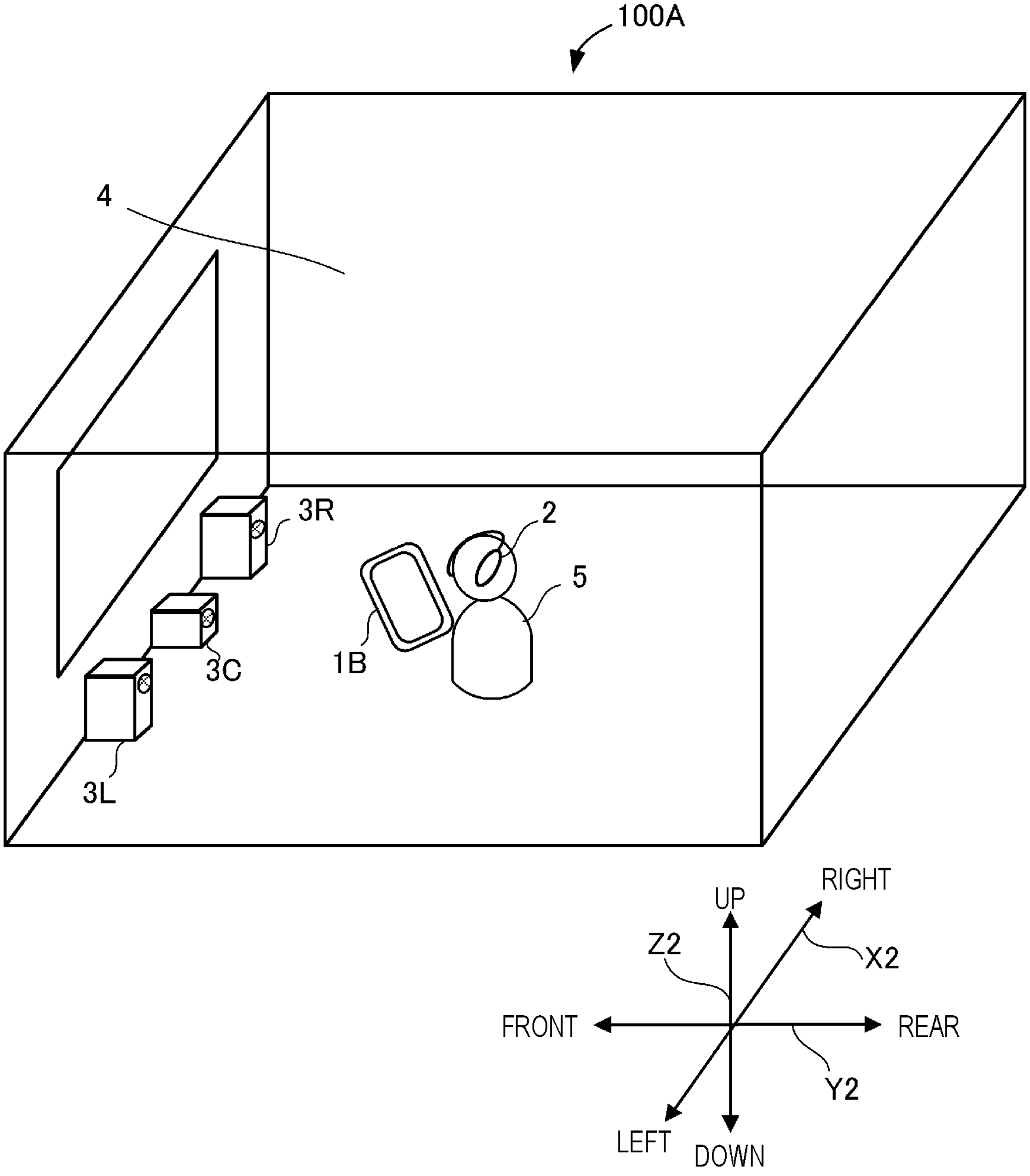
FIG. 11 is a schematic diagram showing a space in which an audio system according to a fourth embodiment is used.

An audio system 100A according to the fourth embodiment sends an audio signal to a plurality of speakers. The audio system 100A according to the fourth embodiment will be described with reference to FIG. 11. FIG. 11 is a schematic diagram showing the space 4 in which the audio system 100A according to the fourth embodiment is used. In this embodiment, a speaker 3L, a speaker 3R, and a speaker 3C are used. As shown in FIG. 11, the user 5 listens to the content facing the front side of the space 4 (the front side in the front-rear direction Y2). In this embodiment, the mobile terminal 1 stores arrangement locations of the speaker 3L, the speaker 3R, and the speaker 3C. The same components as those in the first embodiment are designated by the same reference numerals, and detailed description thereof will be omitted. Since the speaker 3L and the speaker 3R have the same configuration and function as the speaker 3 described above, detailed description thereof will be omitted.

When the location of the sound source exists in the region A1, the mobile terminal 1 distributes the audio signal included in the audio data to the speaker 3L, the speaker 3R, or the speaker 3C based on the sound source location information. For example, when the location of the sound source is between the speaker 3L and the speaker 3C, the mobile terminal 1 sends the audio signal to the speaker 3L and the speaker 3C. For example, when the location of the sound source is between the speaker 3R and the speaker 3C, the mobile terminal 1 sends the audio signal to the speaker 3R and the speaker 3C.

The localization processing unit 163 adjusts a gain of the audio signal sent to each of the speaker 3L, the speaker 3R, and the speaker 3C based on the sound source location information of the sound source acquired by the sound source information acquisition unit 162, so as to perform the panning processing. As a result, the mobile terminal 1 can localize the sound image of the sound source at a predetermined location.

In the audio system 100A according to the fourth embodiment, the plurality of speakers (the speaker 3L, the speaker 3R, and the speaker 3C) emit sound. As a result, the audio system 100A can more accurately localize the sound image by compensating for the sense of localization with the plurality of speakers. Therefore, in the audio system 100A, the sound image localization is further improved when the headphone 2 is used.

Fifth Embodiment

Figure 12:
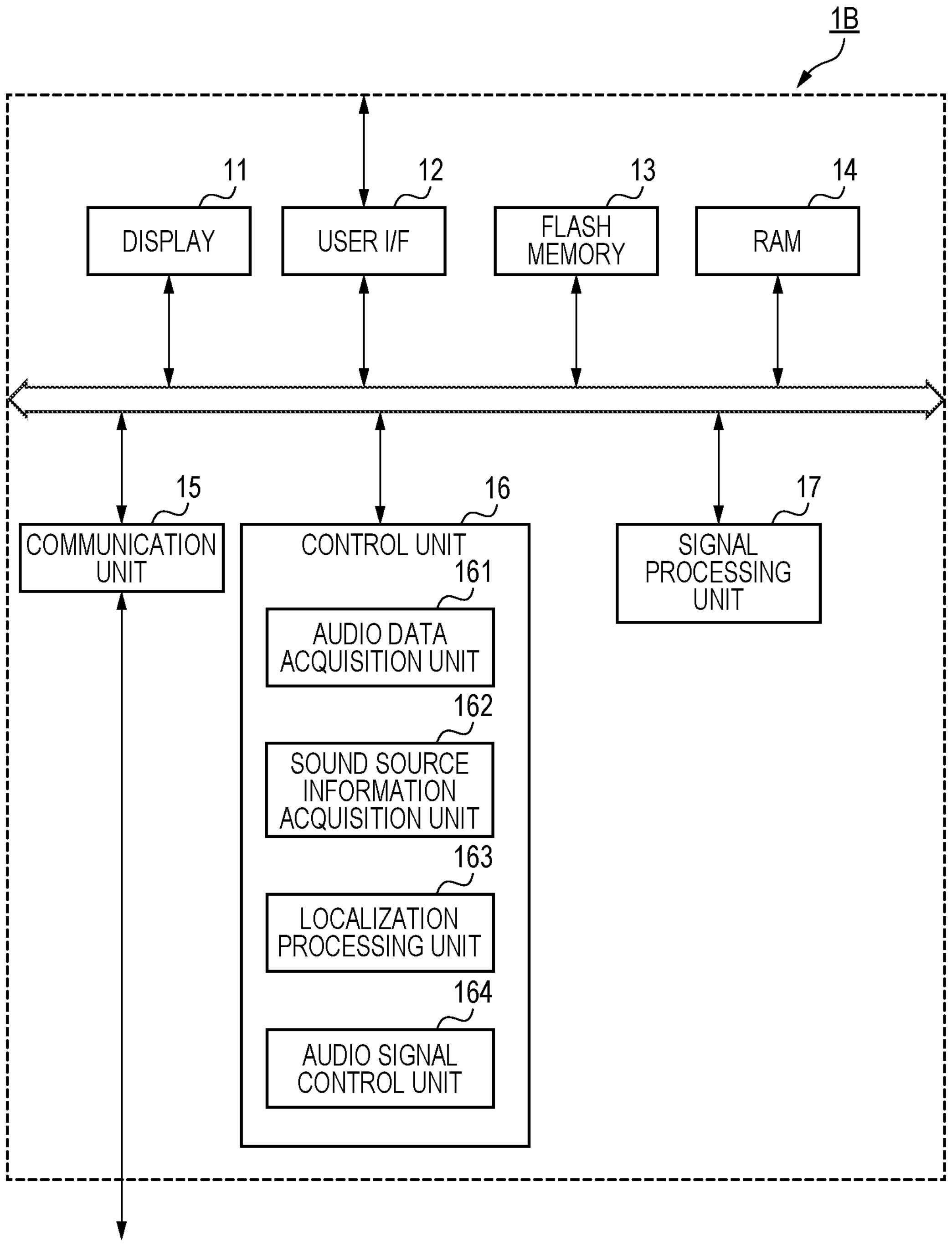
FIG. 12 is a block configuration diagram showing a main configuration of a mobile terminal according to the fourth embodiment.

In the audio system 100 according to the fifth embodiment, an output timing of the audio signal output to the headphone 2 is adjusted based on the speaker location information. The mobile terminal 1B of the fifth embodiment will be described with reference to FIG. 12. FIG. 12 is a block configuration diagram showing a main configuration of a mobile terminal 1B according to the fifth embodiment. The same components as those in the first embodiment are designated by the same reference numerals, and detailed description thereof will be omitted.

A timing at which the sound is emitted from the speaker 3 and a timing at which the sound is emitted from the headphone 2 may be different. Specifically, the headphone 2 is worn on the ears of the user 5, and the sound is emitted directly to the ears. On the other hand, there is a space between the speaker 3 and the user 5, and the sound emitted from the speaker 3 reaches the ears of the user 5 through the space 4. In this way, the sound emitted from the speaker 3 reaches the ears of the user 5 with a delay compared with the sound emitted from the headphone 2. The mobile terminal 1B delays, for example, the timing at which the sound is emitted from the headphone 2 in order to match the timing at which the sound is emitted from the speaker 3 with the timing at which the sound is emitted from the headphone 2.

The mobile terminal 1B includes a signal processing unit 17. The signal processing unit 17 includes one or a plurality of DSPs. In this embodiment, the mobile terminal 1B stores a listening position and an arrangement location of the speaker 3. The mobile terminal 1B displays, for example, a screen 111 that imitates the space 4 (see FIG. 6). The mobile terminal 1B calculates a delay time between the listening position and the speaker 3. For example, the mobile terminal 1B sends an instruction signal to the speaker 3 so as to emit test sound from the speaker 3. By receiving the test sound from the speaker 3, the mobile terminal 1B calculates a delay time of the speaker 3 based on a difference between a time when the instruction signal is sent and a time when the test sound is received. The signal processing unit 17 performs delay processing on the audio signal to be sent to the headphone 2 according to the delay time between the listening position and the speaker 3.

The mobile terminal 1B according to the fifth embodiment adjusts arrival timings of the sound emitted from the speaker 3 and the sound emitted from the headphone 2 by performing the delay processing on the audio signal sent to the headphone 2. As a result, the user 5 listens to the sound emitted from the speaker 3 and the sound emitted from the headphone 2 at the same timing, so that there is no deviation of the same sound and deterioration of the sound quality can be reduced. Therefore, even when the sound is emitted from the speaker 3, the content can be listened to without discomfort.

[First Modification]

A mobile terminal 1C according to the first modification detects a center direction, which is a direction the user 5 faces. The mobile terminal 1C according to the first modification determines a speaker in the center direction. The mobile terminal 1C detects the center direction, which is the direction the user 5 faces, by using a head tracking function. The head tracking function is a function of the headphone 2. The headphone 2 tracks movement of the head of the user 5 who wears the headphone 2.

Figure 13:
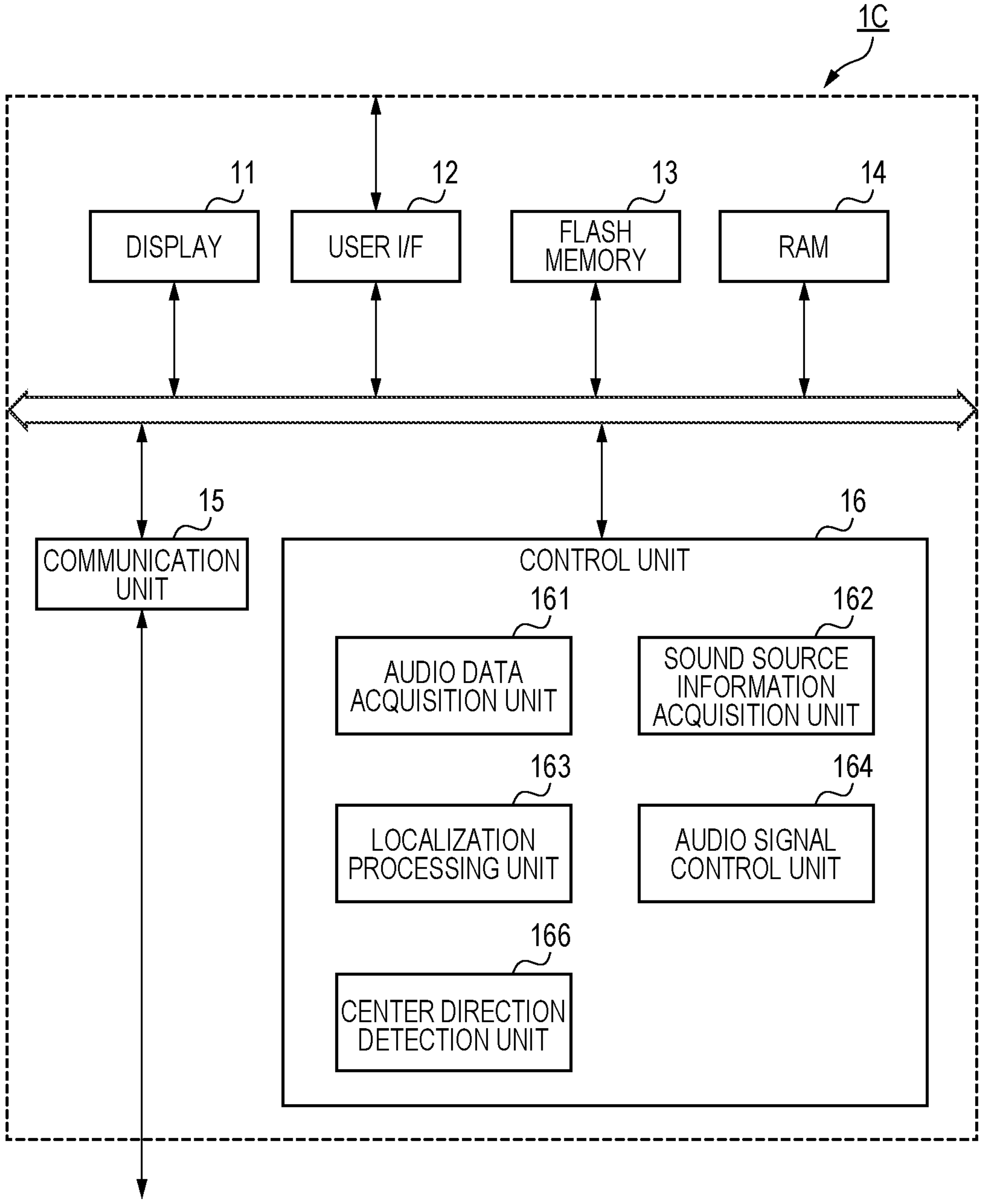
FIG. 13 is a block configuration diagram showing a main configuration of a mobile terminal according to a second modification.

As shown in FIG. 13, the mobile terminal 1C further includes a center direction detection unit 166. The center direction detection unit 166 detects the center direction, which is the direction the user 5 faces.

The mobile terminal 1C determines a reference direction based on operation from the user 5. The center direction detection unit 166 receives and stores a direction of the speaker 3 by, for example, operation from the user 5. For example, the center direction detection unit 166 displays an icon described as "center reset" on the display 11 and receives operation from the user 5. The user 5 taps the icon when facing the speaker 3. The center direction detection unit 166 assumes that the speaker 3 is installed in the center direction at the time of tapping, and stores the direction (reference direction) of the speaker 3. In this case, the mobile terminal 1C determines the speaker 3 as the speaker in the center direction. The mobile terminal 1C may be assumed as receiving the operation of the "center reset" during start-up, or may be assumed as receiving the operation of the "center reset" when the program shown in the present embodiment is started.

The headphone 2 includes a plurality of sensors such as a gyro sensor. The headphone 2 detects a direction of the head by using, for example, an acceleration sensor or a gyro sensor. The headphone 2 calculates an amount of change in the movement of the head of the user 5 from an output value of the acceleration sensor or the gyro sensor. The headphone 2 sends the calculated data to the mobile terminal 1C. The center direction detection unit 166 calculates a changed angle of the head with reference to the above-mentioned reference direction. The center direction detection unit 166 detects the center direction based on the calculated angle. The center direction detection unit 166 may calculate the angle by which the direction of the head changes at regular intervals, and may set the direction the user faces at the time of calculation as the center direction.

When the location of the sound source is in the region A1, the mobile terminal 1C sends an audio signal to the determined speaker (the speaker 3 in this embodiment). On the other hand, when the direction of the head of the user 5 changes by 90 degrees or more in a plan view, the mobile terminal 1C stops sending the audio signal to the speaker 3 even when the location of the sound source is in the region A1. For example, when the user 5 turns 90 degrees to the right after the user 5 presses the "center reset" toward the speaker 3, the center direction becomes 90 degrees to the right. That is, the speaker 3 is located on a left side of the user 5. Therefore, when the direction of the head of the user 5 changes by 90 degrees or more in a plan view, the mobile terminal 1C determines that the speaker 3 does not exist in the region A1 and stops sending the audio signal to the speaker 3.

In this way, by using the tracking function of the headphone 2, the mobile terminal 1C can cause the speaker to emit the sound of the sound source only when the speaker exists in the center direction of the user 5. Therefore, the mobile terminal 1C can appropriately cause the speaker to emit sound according to the direction of the head of the user 5 to improve the sound image localization.

[Second Modification]

Figure 14:
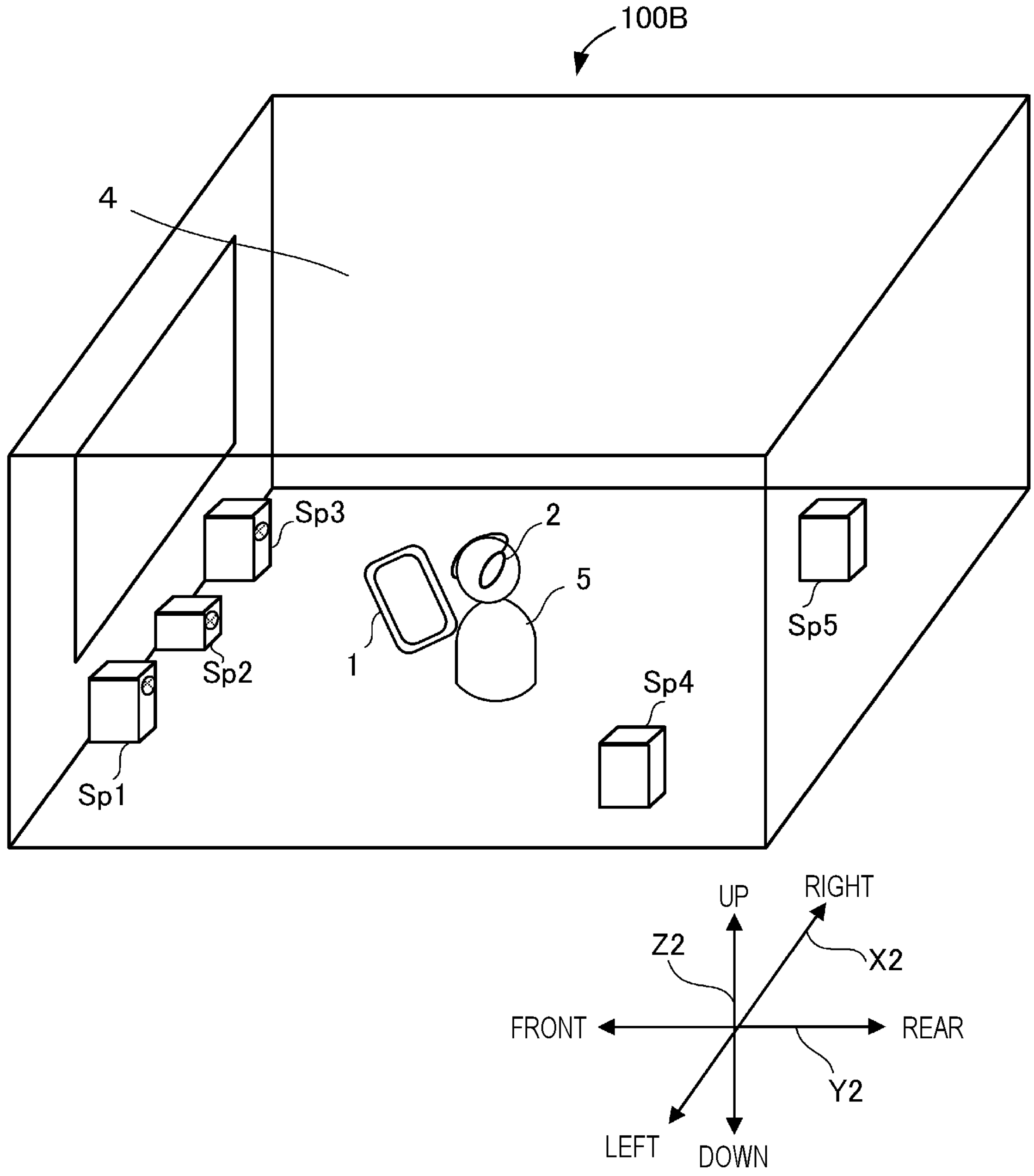
FIG. 14 is a schematic diagram showing a space in which an audio system according to the second modification is used.

A method for detecting a relative location of the mobile terminal 1 and the speaker will be described with reference to FIG. 14. FIG. 14 is a schematic diagram showing an example of the space 4 in which an audio system 100B according to the second modification is used. The audio system 100B according to the second modification includes, for example, a plurality of (five) speakers. That is, as shown in FIG. 14, a speaker Sp1, a speaker Sp2, a speaker Sp3, a speaker Sp4, and a speaker Sp5 are arranged in the space 4.

The user 5 detects locations of the speakers using, for example, a microphone of the mobile terminal 1. More specifically, the microphone of the mobile terminal 1 collects test sound emitted from the speaker Sp1 at three places close to the listening position, for example. The mobile terminal 1 calculates a relative location between a location P1 of the speaker Sp1 and the listening position based on the test sound collected at the three places. The mobile terminal 1 calculates a time difference between a timing at which the test sound is emitted and a timing at which the test sound is collected for each of the three locations. The mobile terminal 1 obtains a distance between the speaker Sp1 and the microphone based on the calculated time difference. The mobile terminal 1 obtains the distance to the microphone from each of the three locations, and calculates the relative location between the location 1 of the speaker Sp1 and the listening position by a principle of trigonometric function (trigonometric survey). In this way, relative locations between each of the speaker Sp2 to the speaker Sp5 and the listening position are sequentially calculated by the same method.

The user 5 may provide three microphones to collect the test sound at the three places at the same time. One of the three locations close to the listening position may be the listening position.

The mobile terminal 1 stores the relative locations between each of the speaker Sp1, the speaker Sp2, the speaker Sp3, the speaker Sp4, and the speaker Sp5 and the listening position in a storage unit.

As described above, in the audio system 100B according to the second modification, the locations of the speaker Sp1, the speaker Sp2, the speaker Sp3, the speaker Sp4, and the speaker Sp5 can be automatically detected.

The listening position may be set by operation from the user. In this case, for example, the mobile terminal 1 displays a schematic screen showing the space 4 and receives the operation from the user.

[Third Modification]

Figure 15:
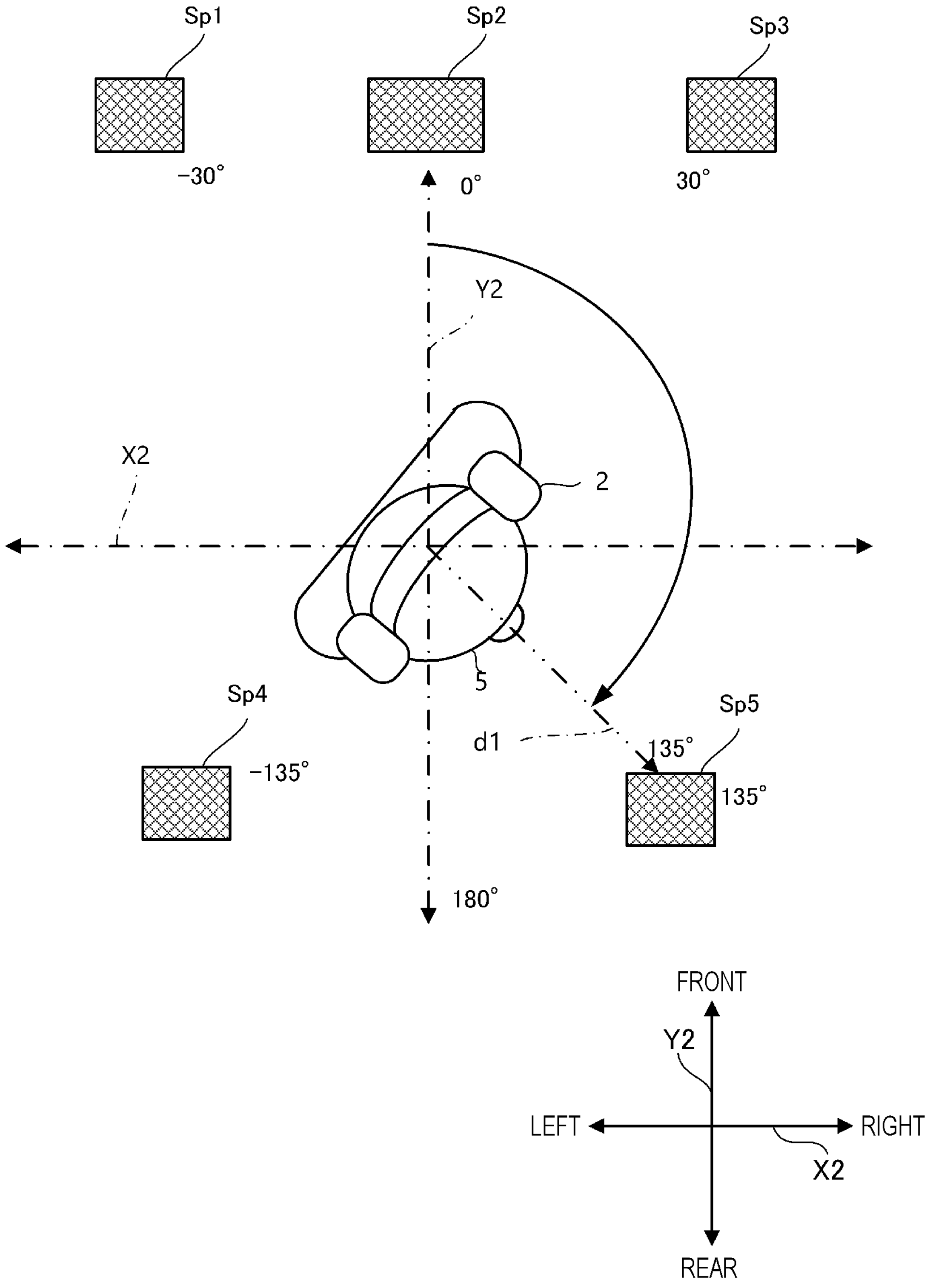
FIG. 15 is an explanatory diagram of an audio system according to a third modification, in which a user and speakers are viewed from a vertical direction (in a plan view)

The audio system 100B according to the third modification automatically determines the speaker in the center direction by combining the mobile terminal 1C provided with the center direction detection unit 166 and the head tracking function described in the first modification, and the automatic detection function for the speaker location in the second modification. The audio system 100B according to the third modification will be described with reference to FIG. 15. FIG. 15 is an explanatory diagram of the audio system 100B according to the third modification, in which the user 5 and the speakers are viewed from the vertical direction (in a plan view).

FIG. 15 shows a case where the user 5 changes the direction of the head from looking to the front side (the front side in the front-rear direction Y2 and a center in the left-right direction X2) in the space 4 to looking diagonally to a rear right side (a rear side in the front-rear direction Y2 and a right side in the left-right direction X2). The direction the user 5 faces can be detected by the head tracking function. Here, the mobile terminal 1C stores a relative location of the speakers (a direction in which each speaker is installed) with respect to the listening position. For example, the mobile terminal 1C stores the installation direction of the speaker Sp2 as the front direction (0 degrees), the speaker Sp3 as 30 degrees, the speaker Sp5 as 135 degrees, the speaker Sp1 as −30 degrees, and the speaker Sp4 as −135 degrees. The user 5 taps an icon such as the "center reset" when facing the direction of the speaker Sp2, for example. As a result, the mobile terminal 1C determines the speaker Sp2 as the speaker in the center direction.

The mobile terminal 1C automatically determines the speaker in the center direction of the user 5 among the speaker Sp1, the speaker Sp2, the speaker Sp3, the speaker Sp4, and the speaker Sp5. For example, when the user 5 rotates 30 degrees to the right side in a plan view, the mobile terminal 1C changes the speaker in the center direction from the speaker Sp2 to the speaker Sp3. In the example shown in FIG. 15, the user 5 faces a direction rotated 135 degrees to the right side in a plan view. The center direction of the user 5 shown in FIG. 15 is shown as a direction dl. In this case, the speaker Sp5 is installed in the center direction of the user 5. Therefore, the mobile terminal 1C changes the speaker in the center direction from the speaker Sp3 to the speaker Sp5. The mobile terminal 1C sends an audio signal to the speaker Sp5. That is, the mobile terminal 1C periodically determines a speaker that matches the direction the user 5 faces, and when it is determined that the speaker installed in the center direction of the user 5 becomes a different speaker, the speaker in the center direction is changed to a different speaker.

When the center direction of the user 5 faces between the plurality of speakers, the mobile terminal 1C may perform the panning processing using two speakers installed with the center direction of the user 5 sandwiched therebetween, and may set a virtual speaker that is phantom-localized in the center direction of the user 5. For example, when the user 5 faces between the speaker Sp4 and the speaker Sp5, the mobile terminal 1C performs the panning processing on each of the speaker Sp4 and the speaker Sp5 by adjusting the gain of the audio signal corresponding to the same sound source. As a result, the mobile terminal 1C can set a virtual speaker between the speaker Sp4 and the speaker Sp5.

In this way, when the center direction of the user 5 and the direction of the speaker match with each other, the mobile terminal 1C sends an audio signal to the speaker in the direction with which the center direction of the user 5 matches. When the center direction of the user 5 faces between the speakers, the mobile terminal 1C may distribute the audio signal to the plurality of speakers near the center direction and set a virtual speaker that is phantom-localized in the center direction of the user 5. As a result, the mobile terminal 1C can set so that the speaker always exists in the center direction of the user 5, and can make the sound of the sound source reach from the front side of the user 5.

As described above, the mobile terminal 1C according to the third modification can automatically determine the speaker in the center direction according to the movement of the user 5 by using the head tracking function and the automatic detection function for the speaker location.

[Fourth Modification]

The audio system 100 according to the fourth modification describes a method for the user 5 moving the sound source. For example, the mobile terminal 1 displays a sound source location change operation screen for receiving sound source location change operation on the display 11. The mobile terminal 1 acquires the location of the sound source from the sound source location information included in the audio data. The mobile terminal 1 displays the acquired location of the sound source on a screen imitating the space 4, for example. The user 5 can change the location of the sound source by operating the screen, for example. When the sound source location change operation by the user 5 is received, the mobile terminal 1 performs the sound image localization processing on the audio signal based on the changed location of the sound source.

The audio system 100 according to the fourth modification can move the location of the sound source to a place desired by the user 5.

[Fifth Modification]

Figure 16:
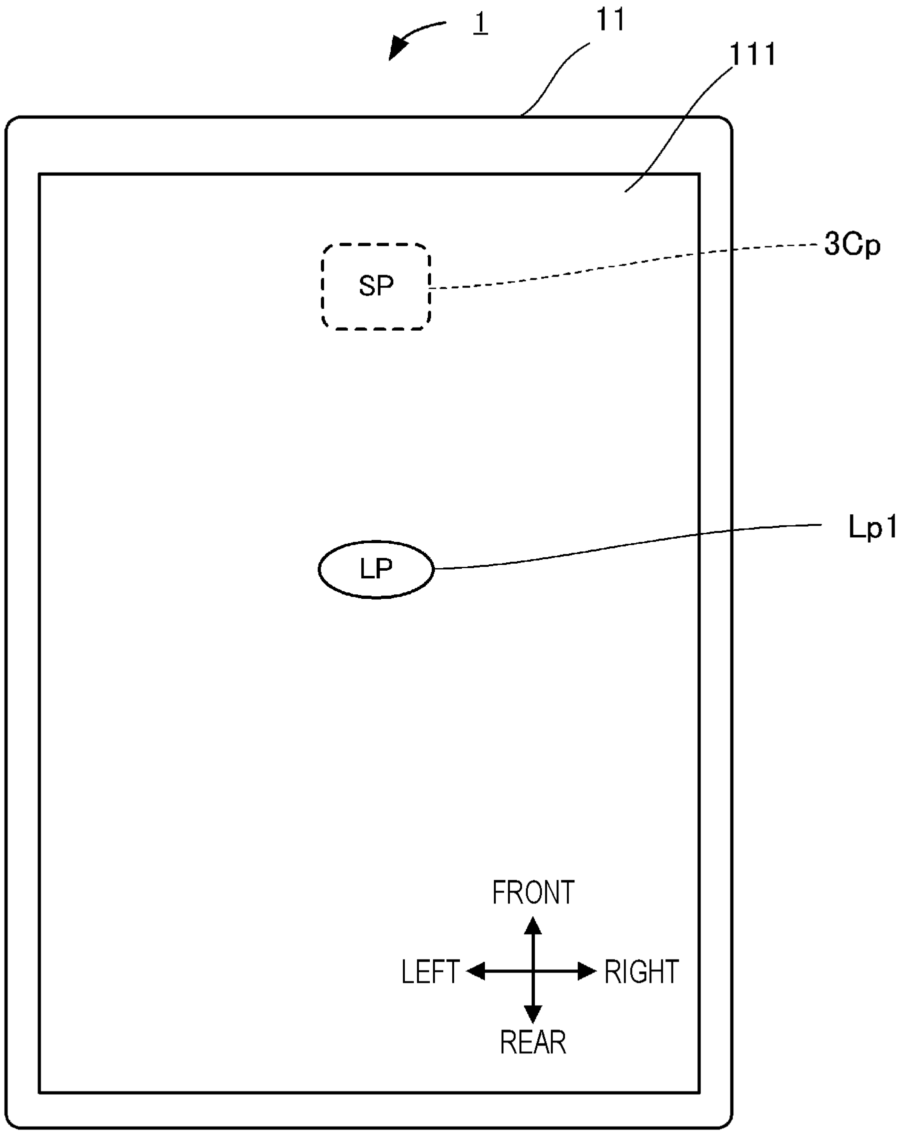
FIG. 16 is an explanatory diagram showing an example of a screen displayed on a mobile terminal according to a fifth modification.

The mobile terminal 1 according to the fifth modification determines a speaker that the user 5 wants to emit sound. In this case, the mobile terminal 1 determines a speaker to which the audio signal is sent based on operation by the user 5. FIG. 16 is an explanatory diagram showing an example of a screen displayed on the mobile terminal 1 according to the fifth modification.

An example of a method for determining the speaker will be specifically described. As shown in FIG. 16, the mobile terminal 1 displays a screen 111 that imitates the space 4. The display 11 displays a listening position (LP) Lp1 in a center of the screen 111. The display 11 displays arrows indicating a front side, a rear side, a left side, and a right side so that the front side, the rear side, the left side, and the right side can be seen. The user 5 inputs a location 3Cp of the speaker 3 in the displayed screen 111 by, for example, tapping the screen 111. For example, the mobile terminal 1 acquires and stores coordinates of the input location 3Cp of the speaker 3. In this embodiment, only a location of one speaker (the speaker 3) is stored. Therefore, when the sound source exists in the region A1, the mobile terminal 1 sends an audio signal to the speaker 3, which is the one speaker. On the other hand, when the user 5 inputs locations of a plurality of speakers, the user 5 selects the speaker he or she wants to emit the sound by using the mobile terminal 1. Specifically, the mobile terminal 1 displays, for example, a list of names or locations of the plurality of speakers. Upon receiving selection operation from the user 5, the mobile terminal 1 determines the speaker to which the audio signal is sent.

In this way, the mobile terminal 1 according to the fifth modification can send the audio signal to the speaker determined by the user 5 when the location of the sound source exists in the region A1.

[Other Modifications]

The speaker used in the audio system 100 is not limited to the fixed speaker arranged in the space 4. The speaker may be, for example, a speaker attached to the mobile terminal 1. The speaker may also be, for example, a mobile speaker and a PC speaker.

In the above embodiments, examples of sending the audio signal by wireless communication are described, but the present invention is not limited thereto. The mobile terminals 1, 1A, 1B, and 1C may send the audio signal to the speaker or the headphone using wired communication. In this case, the mobile terminal 1 may send an analog signal to the speaker or the headphone.

In the above embodiments, the mobile terminals 1, 1A, 1B, and 1C are described as examples of sending the same audio signal to the speaker and the headphone, but the present invention is not limited thereto. The mobile terminals 1, 1A, 1B, and 1C may send only the audio signal whose sound source exists in the region A1 to the speaker.

The mobile terminals 1, 1A, 1B, and 1C may also emit the sound of the sound source from the speaker even when the location of the sound source does not exist in the region A1. In the audio system 100, one or a plurality of speakers actually emit sound related to the sound source from a location away from the user 5. As a result, the user 5 can perceive the sound image of the sound source at a distant location. Therefore, in the audio system 100 according to the present embodiment, even if the sound is from a sound source outside the region A1, the sense of localization can be improved by compensating for the "sense of distance" with one or the plurality of speakers.

The location information of the sound source may be provided separately from the audio data. That is, the mobile terminals 1, 1A, 1B, and 1C may acquire the location information of the sound source by receiving a signal (data) different from the audio data. The location information of the sound source may be extracted based on correlation among a plurality of channels. More specifically, the mobile terminals 1, 1A, 1B, and 1C calculate a level of the audio signal for each of the plurality of channels and the correlation among the channels. In this case, the mobile terminals 1, 1A, 1B, and 1C estimate the location of the sound source based on the level of the audio signal for each of the plurality of channels and the correlation among the channels. For example, when a correlation between a front L (FL) channel and a front R (FR) channel is high, and a level of the FL channel and a level of the FR channel are high (exceeding a predetermined threshold value), the location of the sound source can be estimated between the FL channel and the FR channel. The location of the sound source can be estimated by obtaining a ratio of the levels of the plurality of channels. For example, if the ratio of the FL channel level to the FR channel level is 1:1, the location of the sound source can be estimated to be exactly a midpoint between the FL channel and the FR channel. As the number of the channels increases, the location of the sound source can be estimated more accurately. The location of the sound source can be almost uniquely specified by calculating correlation values among a large number of channels.

Finally, the description of the embodiments should be considered as exemplary in all respects and not restrictive. The scope of the present invention is shown not by the above embodiments but by the scope of claims. The scope of the present invention includes the scope equivalent to the scope of claims.

What is claimed is:

1. An audio signal output method comprising:

acquiring audio data including an audio signal and sound source location information indicating a location of a sound source;

acquiring the audio data and the sound source location information from the acquired audio data;

performing sound image localization processing of a head-related transfer function on the acquired audio signal based on the acquired sound source location information;

outputting the processed audio signal to an earphone; and outputting the acquired audio signal that has not been performed with sound image localization processing to a speaker, in a state where the location of the sound source indicated by the sound source location information is in a predetermined location.

2. The audio signal output method according to claim 1, wherein the predetermined location is a region that is in front of a top of a user's head.

3. The audio signal output method according to claim 1, further comprising:

adjusting a volume level of sound emitted from the speaker based on the location of the sound source.

4. The audio signal output method according to claim 1, further comprising:

detecting a center direction, which is a direction the user faces; and determining the speaker, from among a plurality of speakers, that outputs the audio signal based on the detected center direction.

5. The audio signal output method according to claim 4, wherein the detecting detects the center direction using a head tracking function.

6. The audio signal output method according to claim 1, wherein the speaker includes a plurality of speakers, and the outputting of the acquired audio signal outputs the audio signal to each of the plurality of speakers.

7. The audio signal output method according to claim 1, further comprising:

acquiring speaker location information of the speaker, and performing signal processing of adjusting an output timing of the audio signal to be output to the earphone based on the acquired speaker location information.

8. The audio signal output method according to claim 7, wherein the speaker location information is acquired by measurement.

9. The audio signal output method according to claim 1, further comprising:

receiving operation to change the location of the sound source from the user, and changing the sound source location information based on the received operation.

10. An audio signal output device comprising:

a memory storing instructions;

a processor that implements the instructions to acquire audio data including an audio signal and sound source location information indicating a location of a sound source;

acquire the audio data and the sound source location information from the acquired audio data;

perform sound image localization processing of a head-related transfer function on the acquired audio signal based on the acquired sound source location information;

output the processed audio signal to an earphone; and output the acquired audio signal that has not been performed with sound image localization processing to a speaker, in a state where the location of the sound source indicated by the sound source location information is in a predetermined location.

11. The audio signal output device according to claim 10, wherein the predetermined location is a region that is in front of a top of a user's head.

12. The audio signal output device according to claim 10, wherein the processor implements the instructions to adjust a volume level of sound emitted from the speaker based on the location of the sound source.

13. The audio signal output device according to claim 10, wherein the processor implements the instructions to detect a center direction, which is a direction a user faces, and determine the speaker, from among a plurality of speakers, that outputs the audio signal based on the detected center direction.

14. The audio signal output device according to claim 13, wherein the processor detects the center direction using a head tracking function.

15. The audio signal output device according to claim 10, wherein:

the speaker includes a plurality of speakers, and the audio signal is output to each of a plurality of the speakers.

16. The audio signal output device according to claim 10, wherein the processor implements the instructions to acquire speaker location information of the speaker, and perform signal processing of adjusting an output timing of the audio signal to be output to the earphone based on the acquired speaker location information.

17. The audio signal output device according to claim 16, wherein the speaker location information is acquired by measurement.

18. The audio signal output device according to claim 10, further comprising:

a user interface that receives operation to change the location of the sound source from a user, wherein the processor implements the instructions to change the sound source location information based on the received operation.

19. An audio system comprising:

an earphone;

a speaker; and an audio signal output device comprising:

a memory storing instructions; and a processor that implements the instructions to:

acquire audio data including an audio signal and sound source location information indicating a location of a sound source;

acquire the audio data and the sound source location information from the acquired audio data;

perform sound image localization processing of a head-related transfer function on the acquired audio signal based on the acquired sound source location information;

output the processed audio signal to the earphone; and output the acquired audio signal that has not been performed with sound image localization processing to the speaker, in a state where the location of the sound source indicated by the sound source location information is in a predetermined location, wherein the earphone comprises:

a first communication unit that receives the audio signal from the audio signal output device, and a first sound emitting unit that emits sound based on the audio signal; and wherein the speaker comprising:

a second communication unit that receives the audio signal from the audio signal output device; and a second sound emitting unit that emits the audio signal.

* * * * *